Sept. 15, 1970  J. P. VERGEZ, JR  3,529,223
VARIABLE SPEED INDUCTION MOTOR CONTROLLER
WITH ROTOR FREQUENCY SENSING
Filed Oct. 4, 1967  3 Sheets-Sheet 1

INVENTOR
JULES P. VERGEZ, JR.

Harold E. Meier

ATTORNEY

Sept. 15, 1970     J. P. VERGEZ, JR     3,529,223
VARIABLE SPEED INDUCTION MOTOR CONTROLLER
WITH ROTOR FREQUENCY SENSING
Filed Oct. 4, 1967     3 Sheets-Sheet 2

INVENTOR
JULES P. VERGEZ, JR.

Harold E. Meier

ATTORNEY

INVENTOR
JULES P. VERGEZ, JR.

Harold E. Meier

ATTORNEY

United States Patent Office 3,529,223
Patented Sept. 15, 1970

3,529,223
VARIABLE SPEED INDUCTION MOTOR CONTROLLER WITH ROTOR FREQUENCY SENSING
Jules P. Vergez, Jr., Richardson, Tex., assignor to Texas Instruments Incorporated, Dallas, Tex., a corporation of Delaware
Filed Oct. 4, 1967, Ser. No. 672,852
Int. Cl. H02p 5/40
U.S. Cl. 318—230
18 Claims

ABSTRACT OF THE DISCLOSURE

Apparatus for controlling an induction motor including means responsive to an induced voltage in the stator windings proporational to the actual speed of the motor. The motor windings have one common connection to a programmed DC power supply and are individually connected to ground through a plurality of power switches sequenced by a logic circuit controlled from a variable oscillator. A voltage proportional to the difference between the induced voltage and the applied winding voltage is compared with a slip speed reference voltage in a differential amplifier. The output of the differential amplifier controls the programmed DC power supply and the variable oscillator.

---

Figure 1:
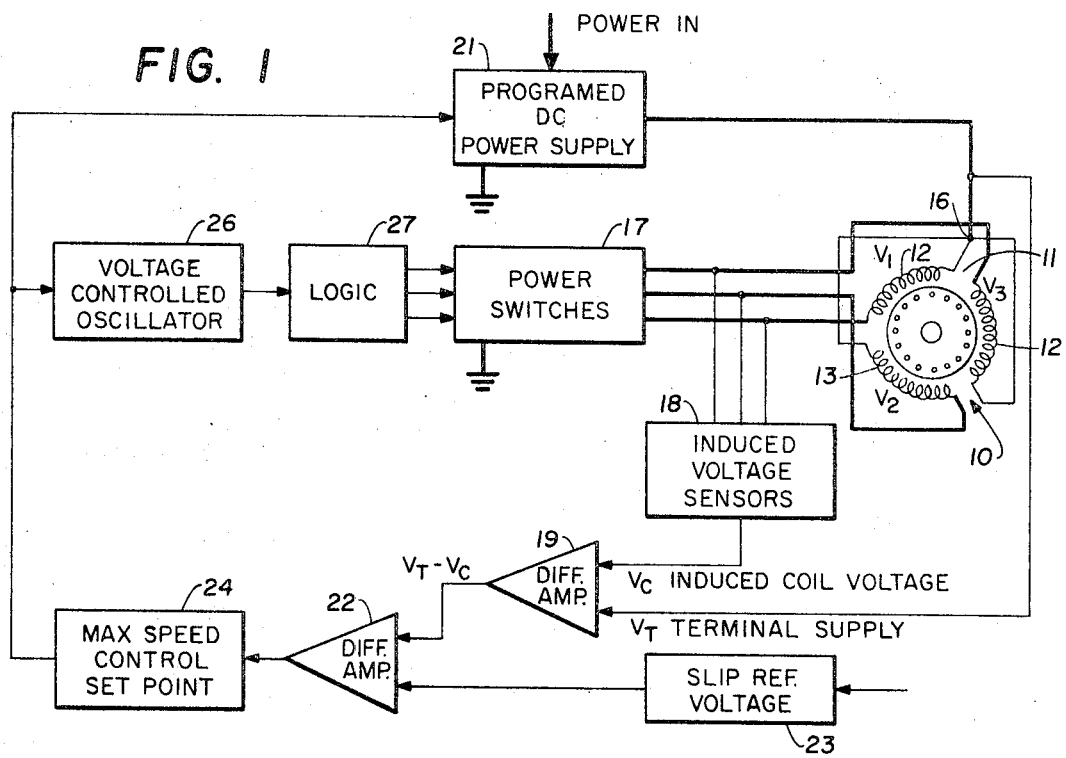

This invention relates to induction motor control and, more particularly, to a variable speed induction motor controller with slip sensing.

The simple induction motor fulfills admirably the requirements of substantially constant speed drives. Many motor applications, however, require several speeds, or even a continuously variable range of speeds. The synchronous speed of an induction motor can be varied by (a) changing the number of poles, or (b) varying the stator frequency. Speed control of an induction motor is also possible by varying the rotor slip, that is, the difference between the motor synchronous speed and the actual rotor speed. Slip can be changed by (a) varying the line voltage, (b) varying the rotor resistance, or (c) inserting voltages of appropriate frequency in the rotor circuits. Structurally, the commonest type of induction motors are squirrel cage rotor types which do not lend themselves to speed control by the pole changing method, the rotor resistance varying method, or inserting voltages of appropriate frequencies in the rotor circuit. Thus, there are only two relatively simple methods of varying the speed of an induction motor; that is, varying the line voltage and varying the stator frequency.

Although the squirrel cage induction motor admirably fulfills the requirements of constant speed, the starting torque of a motor with reasonable slippage losses is relatively low, thereby limiting usage to applications that do not start under full load. A reasonably high starting torque can be achieved with a squirrel cage induction motor by designing the rotor with a high internal resistance. However, the slip speed for such a motor is comparatively high with excessive motor losses. Because of the peculiar speed-torque characteristic of a standard design induction motor, if the maximum torque is exceeded, the motor speed quickly stalls. However, the speed torque curve can be shifted in a manner to prevent a high torque load from stalling the motor by (a) varying the line frequency, and (b) varying the line voltage. It will be noted that the methods of varying the torque characteristics of an induction motor are the same as the motor speed changing techniques outlined above. In fact, varying motor speed by changing the line frequency and the line voltage automatically shifts the speed torque curve.

According to the cross-field theory, rotation of a squirrel cage rotor causes the rotor bars to cut through the main axis flux generated by energizing the stator windings. The rotor bars cutting the main axis flux generate a voltage by speed action. Since the squirrel cage rotor is a symmetrically closed circuit, the speed generated voltage causes a current to circulate through the rotor winding. This current, together with the rotor winding turns, gives the rotor an MMF and results in a flux system originating in the rotor. This rotor originating flux is in space quadrature with the main winding flux. Note that it originates in speed action and is proportional to rotor speed and hence disappears at rotor standstill. Under the cross-field theory, an induction motor is considered to have two flux systems; a main flux originates from the stator winding and the cross axis flux originates from an exciting current in the rotor. The stator windings are cut by this motor MMF wave and a voltage is induced therein by transformer action which is 180 electrical degrees out of phase with the voltage energizing the stator winding.

In accordance with the present invention, a rotor induced voltage is used as a measure of actual rotor speed and compared with the applied stator voltage to produce a signal proportional to rotor slip. The generated slip voltage is compared with a desired slip voltage to produce a control signal to vary both the magnitude of the applied voltage and the frequency of the stator winding excitation. Thus, a simple squirrel cage induction motor can be made to start at a slow speed in a fully loaded condition and then gradually build up to high speed operation. Conversely, overloading a squirrel cage induction motor will automatically change the speed-torque curve of the motor until it reaches another stable operating point.

A feature of the present invention is to provide an induction motor controller wherein applied frequency and voltage are controlled by a voltage proportional to the motor slip. In accordance with this invention, apparatus for controlling an induction motor having individual phase windings interconnected at a common point includes a programmed power supply coupled to the common junction of said motor windings. A plurality of switching devices are individually connected to each winding of said motor and collectively connected to ground; they are sequentially actuated to energize the motor windings from the programmed power supply, thereby generating a rotating magnetic field in said motor. A speed voltage proportional to the actual rotor speed, induced into the stator windings by transformer action, is used for comparison with the output of the power supply to generate a voltage proportional to the rotor slip to vary the output of the power supply and the sequencing frequency of the switching devices.

A more complete understanding of the invention and its advantages will be apparent from the specification and claims and from the accompanying drawings illustrative of the invention.

Figure 2:
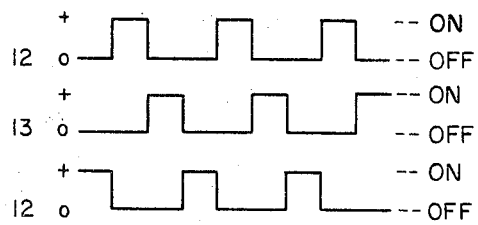
Figure 2:
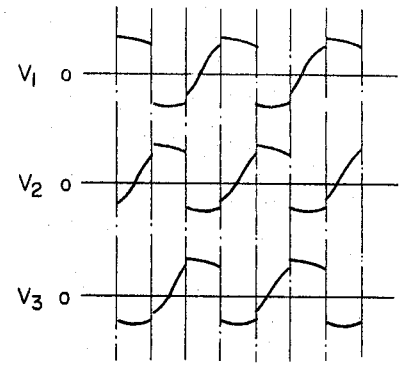
Figure 9:
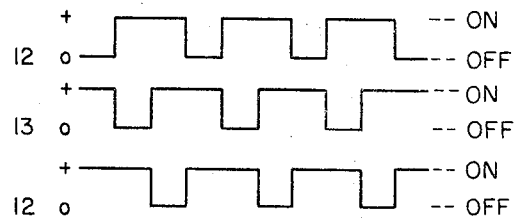
Figure 9:
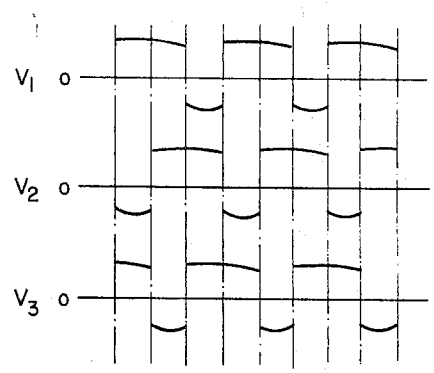
Figure 5:
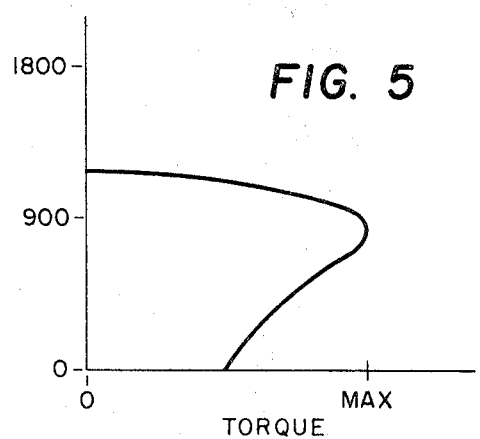
Figure 6:
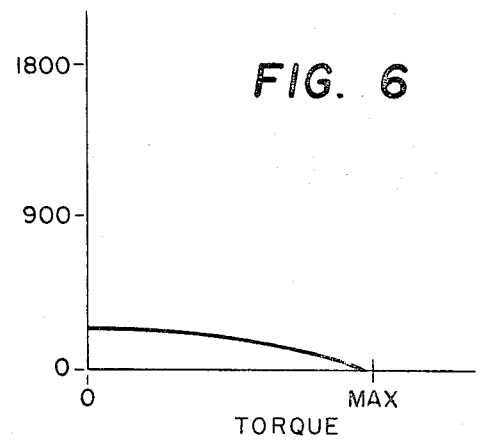
Figure 8:
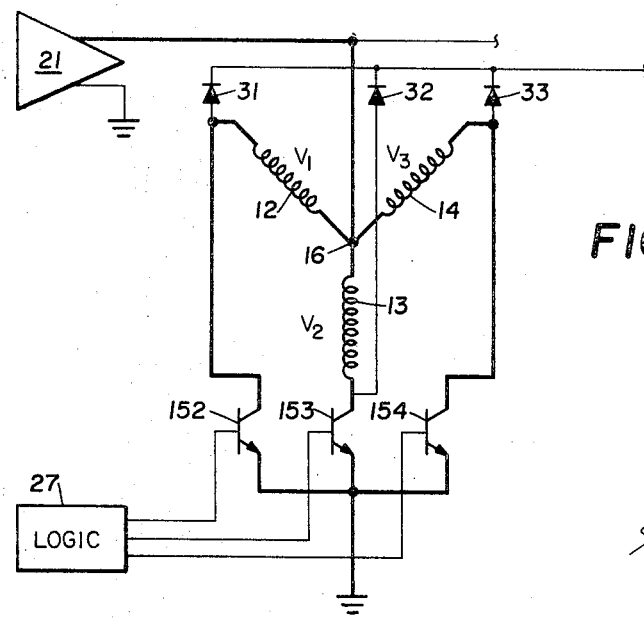
Figure 7:
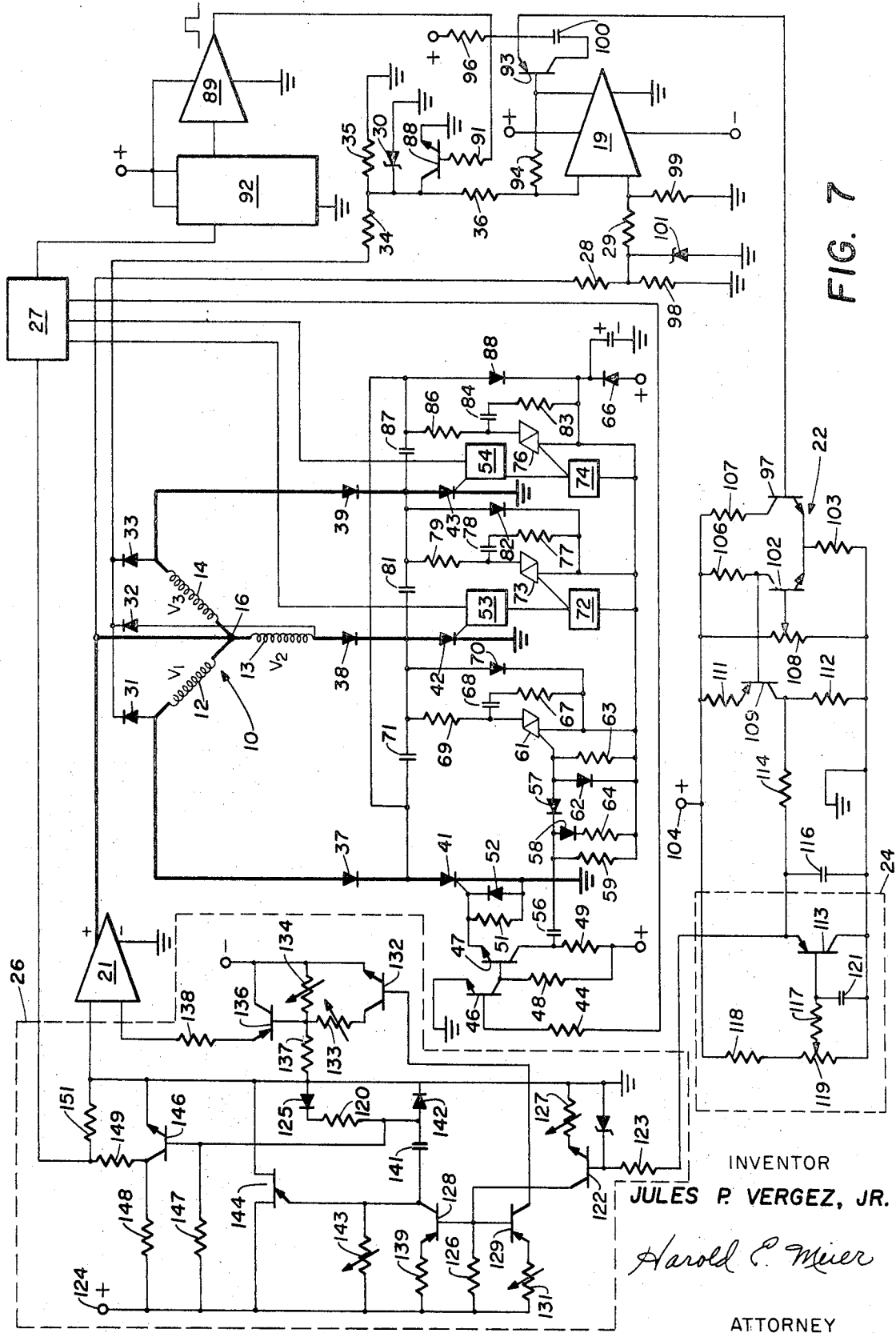

Referring to the drawings:

FIG. 1 is a block diagram of a three-phase induction motor slip sensing control system, FIG. 2 is a series of curves showing the pulse trains for sequencing the power switches of the system of FIG. 1 and the voltages of the stator windings, FIGS. 3–6 are plots of speed versus torque for various values of applied voltage and frequency, FIG. 7 is an electrical schematic of a slip sensing control system in accordance with the present invention, FIG. 8 is an alternate embodiment of a three-phase motor control, and FIG. 9 is a series of curves showing a 240° energizing sequence for the power switches and induced stator voltages.

Referring to FIG 1, there is shown an induced voltage control system for a three-phase induction motor 10 having a squirrel cage rotor 11 in a rotating magnetic field generated by sequentially energizing field windings 12, 13, and 14. The field windings are interconnected at a common terminal 16 and individually connected to power switches 17 in a four-wire Y-configuration. Induced voltage sensors 18 are also coupled to the individual stator windings and respond to a speed voltage induced therein by action of the rotor 11 in a magnetic field produced by energizing the windings 12, 13, and 14. A signal generated by the induced voltage sensors 18 connects to one input terminal of a differential amplifier 19 having a second input terminal tied to a programmed DC power supply 21. The programmed DC power supply is also connected to the terminal 16. A second differential amplifier 22 has a first input terminal coupled to the output of the differential amplifier 19 and a second input terminal coupled to a slip reference voltage source 23. The slip reference voltage is representative of the desired value of rotor slip for the motor 10. The output of the differential amplifier 22 connects to a maximum speed set point voltage source 24 having an output signal coupled to the programmed DC power supply 21 and a voltage controlled oscillator 26. A logic circuit 27 is driven by the output frequency of the oscillator 26 and generates a logic sequence to operate the power switches 17.

In operation, the slip voltage reference is set at the desired value of rotor slip, and the maximum speed set voltage set at the maximum desired motor speed. With the motor 10 in a standstill condition, one input to the differential amplifier 22 is proportional to the voltage at terminal 16 and the other the slip reference voltage. The output signal of the differential amplifier 22 is a control signal connected to the voltage controlled oscillator 26 and the programmed DC power supply 21. This signal establishes the DC voltage level at the terminal 16 and the output frequency of the oscillator 26; it has an upper limit set by the maximum speed controller 24. The oscillator output controls the logic unit 27 to produce three logic pulse trains to the power switches 17, thereby sequentially energizing the stator windings with the DC voltage at the terminal 16. Sequentially energizing the windings 12, 13, and 14 generates a rotating magnetic field and the rotor 11 starts rotating. As the rotor 11 builds up speed, it induces a speed voltage into the stator windings in accordance with the cross-field theory explained previously.

Assume the sequence of energizing the stator windings is 12–13–14. Then the logic pulse trains generated by the unit 27 are as shown in the upper portion of FIG. 2; when $V_{12}$ is positive the winding 12 is energized, when $V_{13}$ is positive winding 13 is energized, and when $V_{14}$ is positive the winding 14 is energized. Each winding is energized for a period of time equal to 120 electrical degrees and de-energized for a period of time equal to 240 electrical degrees. Curves representative of the voltage drop across the stator windings are shown in the lower section of FIG. 2 for each 120° period; when $V_{12}$ is positive the voltage drop across the winding 12 is equal to the voltage at terminal 16. When $V_{12}$ is zero, the voltage across winding 12 is some negative value proportional to the speed of the rotor 11 for the first 120° nonenergized period and some positively increasing voltage for the remainder of the nonconducting period. Similar conditions exist in windings 13 and 14 as they are sequentially energized and de-energized.

The induced voltage sensors 18 are connected to the windings 12, 13, and 14 and respond to the induced speed voltages in these windings in a sequence lagging the energizing sequence by 120 electrical degrees. Thus, if winding 13 is energized, the voltage sensor connected to winding 12 responds to the induced voltage therein, and when winding 14 is energized the induced voltage sensor connected to winding 13 responds to the voltage in that winding. The output of the voltage sensors 18 is compared to the voltage applied to terminal 16 from the programmed DC power supply 21. If the rotor is at standstill, then the output of the sensors 18 is zero and the output of the differential amplifier 19 is proportional to the voltage at terminal 16. On the other hand, if the rotor 11 is operating at synchronous speed, both inputs to the amplifier 19 are equal and the output is zero. Three phase induction motors are not designed to operate at synchonous speed and a speed voltage is always induced into the stator winding during motor operation. If the motor 10 is operating at its designed slip speed, the output of the differential amplifier 19 is equal to the slip reference voltage and the output of the differential amplifier 22 is stable. A stable output from the amplifier 22 occurs only if the output of the programmed DC power supply 21 is at the desired level and the output of the voltage control oscillator 26 at the correct frequency.

If the motor 10 is operating at other than the maximum desired speed, then the maximum speed set point voltage source 24 will not limit the control signal to the programmed DC power supply 21 and the oscillator 26 and an additional increase in the voltage at terminal 16 and the sequencing frequency of the power switches 17 can be made. So long as the control signal from the amplifier 22 increases the voltage at terminal 16 and the sequencing frequency of the power switches 17, an unbalance exists between the input signals to a differential amplifier 19 and the output of the differential amplifier 22 will be changing. This cycle will continue until the motor 10 is operating at its desired maximum speed and at a designed rotor speed; then the output of the differential amplifier 22 will be stable.

If an abnormally heavy load is placed on the motor 10, the rotor 11 slows and the speed voltage decreases proportionally. A voltage differential exists at the input to the differential amplifier 19 and between the input signals to the differential amplifier 22. A new control signal is generated to the oscillator 26 and the programmed DC power supply 21 to reduce the voltage at point 16 and the switching frequency of the power switches 17.

Figure 3:
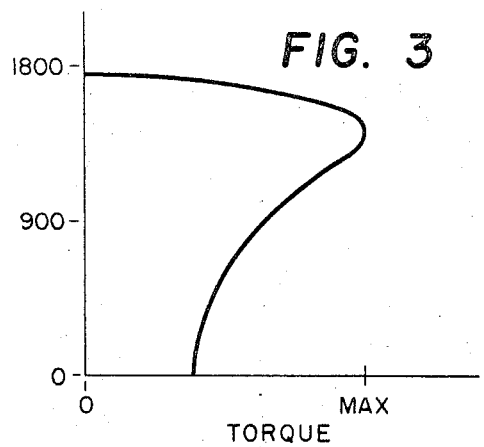
Figure 4:
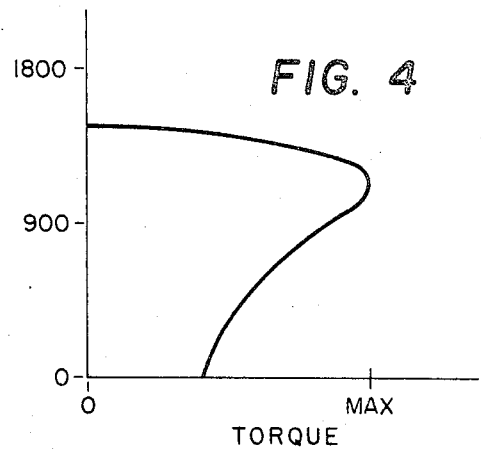

Referring to FIGS. 3–6, there is shown four typical speed-torque curves for a three-phase induction motor having a synchronous speed of 1800 revolutions per minute. Assuming a four-pole motor operating at 60 cycles and at rated voltage, the speed-torque curve is shown in FIG. 3. The curves of FIGS. 4–6 represent lower values of frequency and energizing voltages. As the torque delivered by the rotor 11 increases, the speed of the motor begins to decrease along the curve of FIG. 3. A decreasing rotor speed causes the speed voltage to decrease proportionally and the difference in voltages at the input terminals to the differential amplifier 19 begins to increase. Likewise, there is a change in the difference between the input signals to the terminals of the differential amplifier 22 and the slip speed control signal to the programmed DC power supply 21 and the oscillator 26 causes a readjustment in the voltage applied to terminal 16 and in the output frequency of the oscillator 26. This readjustment will cause the voltage and frequency of the energized stator windings to readjust to the new operating speed of the rotor 11. Thus, a constant differential is maintained between the two input signals to the differential amplifier 19. Readjusting the output of the programmed DC power supply 21 and the oscillator 26 has the effect of changing the speed-torque curve such that the maximum speed is now somewhat less than the designed maximum. This condition is represented in FIG. 4 wherein the new operating speed is in the stable part of the speed-torque curve.

An important feature of the present invention is the ability of the system to operate a motor well over its designed speed rating. As mentioned, the curve of FIG. 3 represents a speed-torque curve of a four-pole induction motor operating at its designed voltage and frequency. Such a motor can be driven well over its designed speed by appropriately increasing the voltage at terminal 16 and the sequencing frequency of the switches 17.

The curves of FIGS. 3–6 also show the advantages of the control system described herein when starting the motor 10 in a fully loaded condition. Referring specifically to FIG. 6, the motor 10 is started by applying a low level voltage to the terminal 16 and a relatively slow sequence on the order of about 5 cycles per second, to the power switches 17. This starts the rotor 11 rotating at a high starting torque, something which has been difficult to achieve in squirrel cage type induction motors. As the motor 10 picks up the load and the rotor 11 begins to pick up speed along the curve of FIG. 6, the supply voltage at the terminal 16 increases along with the frequency of the sequential switching of the power switches 17. The speed-torque curve at some intermediate point between starting and maximum running speed is shown in FIG. 4 and FIG. 5. Thus, the speed-torque characteristics of an induction motor controlled with the system described herein follows the curves of FIGS. 3–6 under all operating conditions.

In a decreasing speed condition the speed-torque characteristic of the motor 10 changes along the curves of FIG. 3, FIG. 4, FIG. 5, and FIG. 6 in that order. When the motor 10 is picking up a load starting from a standstill condition, the speed-torque characteristic changes along the curve of FIG. 6, FIG. 5, FIG. 4, and FIG. 3 in that order.

Referring to FIG. 7, there is shown the motor 10 including stator windings 12, 13, and 14 interconnected at terminal 16. Energizing voltage for the stator windings is supplied by the programmed DC power supply 21 also tied to one input terminal of the differential amplifier 19 through resistors 28 and 29. Individually connected to the stator windings 12, 13, and 14 are sensor diodes 31, 32, and 33, all interconnected to a second input terminal of the differential amplifier 19 through resistors 34 and 36 as part of a signal delay circuit. Also individually connected to the stator windings 12, 13, and 14 are isolation diodes 37, 38, and 39, each in series with a silicon controlled rectifier 41, 42, and 43, respectively. The cathode electrode of the silicon controlled rectifiers 41, 42, and 43 is connected to ground.

To sequentially energize the stator windings 12, 13, and 14, the silicon controlled rectifiers 41, 42, and 43 are made to conduct by applying a gate voltage to their gate electrode. Connected to the gate electrode of the silicon controlled rectifier 41 is a triggering circuit including a resistor 44 in the base circuit of a transistor 47. Transistors 46 and 47 are interconnected to the positive terminal of a direct current supply (not shown) through bias resistors 48 and 49, respectively. The emitter electrode of transistor 46 is tied to ground and the emitter electrode of transistor 47 is coupled to the gate electrode of the SCR 41 and a parallel arrangement including a resistor 51 and a diode 52. The triggering circuit connected to the gate electrode of SCR 41 receives an input pulse from the logic unit 27 which also supplies a pulse train to a triggering circuit 53 coupled to the gate electrode of the SCR 42 and a logic pulse train to a triggering circuit 54 coupled to the gate electrode of the SCR 43. Triggering circuits 53 and 54 are similar to the circuit for triggering the SCR 41.

A silicon control rectifier is triggered from a nonconducting to a conducting condition if the anode is positive with respect to the cathode and a gate voltage is connected to the gate electrode. After conduction has been established, the gate signal is removed and the rectifier remains conducting. To terminate conduction of a SCR, the anode must be made negative with respect to the cathode. The silicon control rectifiers 41, 42, and 43 are made nonconducting by a commutator circut including a section connected to each of the three silicon controlled rectifiers. To back bias the SCR 41, a capacitor 56 is connected to the collector electrode of the transistor 47 and the cathode electrode of a diode 57, the anode electrode of a diode 58, and a resistor 59. Connected to the anode electrode of the diode 57 is the gate of a triac 61 and a parallel arrangement of a diode 62 and a resistor 63. The diode 58 is in series with a resistor 64 interconnected to the resistors 59 and 63 and the diode 62 to the positive terminal of a DC supply (not shown) through a diode 66. The triac 61 is shunted with a resistor 67 in series with a capacitor 68 and is connected to the DC supply through the diode 66. In series with the triac 61 is a resistor 69 connected to the SCR 42, a diode 70, and a capacitor 71 coupled to the silicon control rectifier 41.

A circuit 72 controls conduction through a triac 73 and a circuit 74 controls conduction through a triac 76. The control circuits 72 and 74 are similar to the one described for controlling the triac 61. Triac 73 is shunted by a resistor 77 in series with a capacitor 78. A resistor 79 is in series with the triac 73 and connects to a capacitor 81, a diode 82 and the SCR 43. The triac 76 is shunted by a resistor 83 in series with a capacitor 84. A resistor 86 is tied to the triac 76 and connects to a capacitor 87, a diode 88, the capacitor 71, and the SCR 41.

In operation, assume the SCR 41 is conducting, its anode electrode will be at approximately ground potential and the anode electrode of the silicon controlled rectifiers 42 and 43 at approximately the potential of terminal 16 plus or minus their respective induced stator winding voltage. The capacitors 71 and 87 are charged to a voltage level approximately equal to the voltage at the anode electrodes of the SCR 42 and 43, respectively. If the gate pulse is disconnected from the SCR 41 and applied to the gate electrode of the SCR 42, then the anode electrode of the SCR 42 is immediately tied to ground. However, since the capacitor 71 cannot be discharged instantaneously, the anode of the SCR 41 will go negative with respect to ground by an amount equal to the voltage of the charged capacitor. Thus, the SCR 41 is now nonconducting since its anode has been made negative with respect to its cathode. A similar operation occurs as each of the silicon controlled rectifiers is turned on and off.

When the motor 10 is operating under a low voltage condition, additional voltage may be required to insure cut off of the silicon control rectifiers. This additional cut off voltage is provided by means of the direct current supply connected to the diode 66 as controlled by the triacs 61, 73, and 76. The appropriate capacitor 71, 81 or 87 is charged to the level of the DC supply connected to the diode 66 through the corresponding triac. The triac 61 is controlled from the circuit shown by a signal transmitted through transistors 46 and 47. Triacs 73 and 76 are sequenced along with their associated silicon control rectifier by means of circuits 72 and 74, respectively.

As mentioned above, the capacitor 87 is charged along with the capacitor 71 when the SCR 41 is conducting. By rearranging the logic pulses from the unit 27, the rotation of the motor 10 is reversed and the SCR 43 is gated into conduction following the SCR 41. If the SCR 43 is gated into a state of conduction following the SCR 41 instead of the SCR 42, then the capacitor 87 drives the anode of the SCR 41 negative with respect to ground. The energizing sequence is then 12, 14, 13.

If the energizing sequence is 12, 13, 14, and if winding 12 is energized, then the diode 33 will be conducting and the diodes 31 and 32 back biased. Because of switching transients, a delay is introduced into the speed signal induced in winding 14 before connection to the differential amplifier 19. This delay is generated by a circuit including a Zener diode 30, resistors 34, 35, and 36, and a transistor 88 coupled to the output of a pulse shaping amplifier 89 through a resistor 91. The pulse shaping amplifier 89 receives a signal from a delay unit 92 of a type extensively used in digital control systems. A signal from the logic circuit 27 actuates the delay unit 92 each time it generates a pulse to one of the silicon controlled rectifiers.

The pulse output signal generated by the amplifier 89 drives the transistor 88 into conduction and the voltage in the winding 14 is coupled to ground for the duration of the pulse signal. When the output of the amplifier 89 returns to zero, the induced voltage in the winding 14 is transmitted to a transistor 93 through the amplifier 19 having a feedback resistor 94. Transistor 93 is shunted by a capacitor 100 and tied to the positive terminal of a direct current supply (not shown), through a resistor 96, and to a transistor 97 of the differential amplifier 22. Forward biasing the transistor 93 by a signal from the amplifier 19 charges the capacitor 100 proportional to the amplifier output signal. It also rapidly discharges the capacitor 100 during the existence of an output pulse from the amplifier 89 to ready the capacitor for a subsequent sampling period. The circuit connecting the output voltage of the supply 21 to the amplifier 19 includes, in addition to resistors 28 and 29, resistors 98 and 99 and a voltage clamping Zener diode 101.

In addition to the transistor 97, the differential amplifier 22 includes a transistor 102 having an emitter electrode interconnected with the emitter electrode of the transistor 97 and to an emitter resistor 103 tied to ground. The transistors 97 and 102 are biased from a direct current source at terminal 104 through resistors 107 and 106, respectively. A base drive voltage for the transistor 102 is supplied by a variable resistor 108 connected between the terminal 104 and ground. Resistor 108 provides a means for adjusting the slip speed reference voltage for comparison with the output of the differential amplifier 19. The output of the differential amplifier 22 appears at the collector electrode of a transistor 109 coupled to the cathode electrode of the transistor 102. Transistor 109 also connects to an emitter bias resistor 111 connected to terminal 104 and a collector bias resistor 112 connected to ground. The collector electrode of the transistor 109 is also coupled to the emitter electrode of a transistor 113 through a filter consisting of a resistor 114 and a capacitor 116. Transistor 113 provides a maximum speed set point voltage and includes a base electrode connected to a voltage divider network through a resistor 117. The voltage divider network includes a resistor 118 in series with a variable resistor 119 having a wiper arm connected to the resistor 117. A capacitor 121 provides an AC path from the base electrode of the transistor 113 to ground.

In operation of the set point source 24, the variable resistor 119 is set to establish a base drive voltage for the transistor 113 which represents the maximum desired speed of the motor 10. Transistor 113 will be nonconducting so long as the voltage at the cathode electrode of transistor 109 remains below the base drive voltage established by the resistor 119. When the output of transistor 109 exceeds the base drive on the transistor 113, this transistor conducts and limits the control signal transmitted to the oscillator 26. Thus, the maximum control voltage to the programmed DC power supply 21 and the oscillator 26 is established by adjusting the variable resistor 119.

The output signal of the transistor 109 connects to the base electrode of a transistor 122 through a resistor 123. Transistor 122 is biased from a terminal 124 of a direct current source (not shown) through a collector resistor 126. A variable resistor 127 connected to ground and in series with the emitter electrode of the transistor 122 provides a means for adjusting the upper frequency limit of the output signal from the oscillator 26. Transistor 122 provides an input signal to the base electrode of a transistor 128 and a transistor 129.

Transistor 129 includes an emitter electrode in series with a variable resistor 131 connected to the terminal 124. The collector electrode of the transistor 129 is tied to the base electrode of a transistor 132 having an emitter electrode coupled to the negative terminal of a direct current supply (not shown). In series with the collector electrode of the transistor 132 is a variable resistor 133 for adjusting the maximum voltage output of the power supply 21. Note that resistor 133 does not control the maximum motor speed, but merely limits the output of the amplifier 21 to an acceptable level. The variable resistor 133 forms a junction with a variable resistor 134, the base electrode of a transistor 136, and a resistor 137 tied to ground. The variable resistor 134 provides a means for adjusting the minimum voltage output of the power supply 21. This voltage is set to insure that when the motor is initially put into operation, the voltage appearing at terminal 16 will be sufficient to cause rotation of the rotor 11. Transistor 136 includes an emitter electrode in series with a resistor 138 tied to the input of the power supply 21. The collector electrode of transistor 136 is coupled to the negative terminal of a direct current supply.

Oscillator 26 includes the transistor 128 having an emitter electrode connected to terminal 124 through a resistor 139 and a collector electrode tied to ground through a timing capacitor 141 and a diode 142. The collector electrode of transistor 128 forms a junction with a variable resistor 143 and the control electrode of a unijunction transistor 144. Resistor 143 provides a means for adjusting the minimum frequency of the output signal from the oscillator 26 by varying the charging time of the capacitor 141. The unijunction transistor 144 has a first gate electrode tied to the terminal 124 and the second gate electrode tied to ground. Unijunction transistor 144 in conjunction with the capacitor 141 provide the timing circuit for the oscillator 26. Timing pulses are thus generated at the terminal junction of the capacitor 141 and the diode 142 and coupled to the base electrode of a transistor 146. Transistor 146 is biased by means of a resistor 147 coupled to the terminal 124 and a resistor 120 coupled to ground through a diode 125. The collector electrode of transistor 146 is also tied to terminal 124 through a bias resistor 148 and to the logic circuit 27 by means of a voltage divider network including resistors 149 and 151.

Operation of the system shown in FIG. 7 is basically as described previously with respect to FIG. 1. A frequency signal from the transistor 146 is coupled to the logic circuit 27 which is simply a configuration of logic flip-flop circuits interconnected to produce pulse trains of the type shown in the upper portion of FIG. 2. A logic network is also provided to produce the logic pulses to the delay unit 92. Since the logic system 27 is merely an arrangement of well known components, additional description is not believed necessary for an understanding of the present invention. The voltage output of the programmed DC power supply 21 sequentially energizes the stator windings 12, 13, and 14 through the respective silicon control rectifiers 41, 42, or 43. Diodes 31, 32, and 33 are forward biased by the speed voltage induced into the stator windings. The conduction sequence of the diodes follows the energizing sequence of the stator windings. Conduction through one of the diodes 31, 32, or 33 automatically back biases the other two. The voltage appearing in the stator winding associated with the conducting sensor diode is transmitted as one input to the differential amplifier 19 as explained above. The operation of the remainder of the system of FIG. 7 has been described previously.

Referring to FIG. 8, there is shown an alternate embodiment of the system of FIG. 7 where the silicon controlled rectifiers are replaced with power transistors 152, 153, and 154. The stator windings 12, 13, and 14 are supplied an energizing voltage from the programmed DC power supply 21 connected to the terminal 16. The induced speed voltage in the stator windings is transmitted to the control circuitry through the diodes 31, 32, and 33. Transistors 152, 153, and 154 function as an on-off switch and are sequentially turned on by pulse signals from the logic unit 27. Operationally the system of FIG. 8 is similar to that of FIG. 7; however, the commutating network and the gate triggering circuits required with silicon controlled rectifiers are not needed. Primarily this is because of the switching characteristics of transistors which can be turned off by merely removing the base drive voltage.

The system of FIG. 8, like the system of FIG. 7, also lends itself to dual voltage motor operation. Instead of energizing only one stator winding during a given interval of time, two windings are energized simultaneously. Referring to FIG. 9, the pulse trains generated by the logic unit 27 are shown on the upper portion where $V_{12}$ is the base drive voltage for the transistor 152, $V_{13}$ is the base drive voltage for the transistor 153, and $V_{14}$ is the base drive voltage for the transistor 154. Note that for the first 120 electrical degrees the windings 12 and 14 are energized, for the second 120 electrical degrees the windings 12 and 13 are energized, and for the third 120 electrical degree period the windings 13 and 14 are energized. The voltages appearing across the various stator windings during their energized and de-energized states are represented by the curves in the lower portion of FIG. 9. If windings 13 and 14 are energized, then a voltage will be induced in winding 12 which forward biases the diode 31, and a speed voltage signal is transmitted to the differential amplifier 19. By energizing two windings at a time, the strength of the rotating magnetic field is double that developed by energizing only one winding. Thus, to produce a magnetic field of a given strength when two windings are energized requires only half the applied voltage.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. Apparatus for controlling an induction motor having individual phase windings interconnected at a common junction comprising:

a power supply controllable from an external signal to generate a variable voltage coupled to the common junction of said motor windings, a plurality of switching means individually connected to each winding of said motor and collectively connected to ground, sequential actuating means for actuating said plurality of switching means to sequentially energize the individual motor windings from the output voltage of said power supply, thereby generating a rotating magnetic field in said motor, means respectively connected to said motor windings responsive to a speed voltage induced therein which is proportional to the actual rotor speed, means for generating a slip speed voltage proportional to said speed voltage and said variable voltage, and means for generating a control signal to said sequential actuating means and said power supply in accordance with said slip speed voltage to change the voltage supplied to said common junction and the sequencing frequency of said switching means to vary the speed of said motor.

2. Apparatus for controlling an induction motor as set forth in claim 1 wherein said speed voltage means is responsive to the induced current flow in a winding other than one energized from said power supply.

3. Apparatus for controlling an induction motor as set forth in claim 2 wherein the induced current is detected sequentially in a pattern following in time the sequential actuation of said plurality of switching means.

4. Apparatus for controlling an induction motor as set forth in claim 2 wherein said current flow responsive means includes a diode connected to each winding to be forward biased by an induced current flow and back biased by voltage signal applied to the common junction.

5. Apparatus for controlling an induction motor having individual phase windings connected to a common junction comprising:

a power supply controllable from an external signal to generate a variable voltage coupled to the common junction of said motor windings, a plurality of switching means individually connected to each winding of said motor and collectively connected to ground, sequential control means for actuating said plurality of switching means to sequentially energize the individual motor windings from the output voltage of said power supply, thereby generating a rotating magnetic field in said motor, means connected to each of said motor windings responsive to a speed voltage induced therein when disconnected from said power supply, said speed voltage proportional to the actual rotor speed, differential amplifying means connected to said speed voltage responsive means and the output voltage of said power supply and generating a slip speed voltage proportional to the difference in said voltages, and means for generating a control signal to said sequential control means and said power supply in accordance with the output signal of said differential amplifying means to change the voltage supplied to said common junction and the sequencing frequency of said switching means to vary the speed of said motor.

6. Apparatus for controlling an induction motor as set forth in claim 5 wherein said generating means includes a slip voltage reference source and a differential amplifier having as a first input the slip voltage output of said first differential amplifying means and as a second input the slip voltage reference.

7. Apparatus for controlling an induction motor as set forth in claim 6 wherein said generating means also includes a maximum speed set point voltage source for establishing a maximum motor speed connected to the output of said second differential amplifier.

8. Apparatus for controlling an induction motor as set forth in claim 7 wherein said speed voltage responsive means includes a diode connected to each winding of said motor to be forward biased by an induced current and back biased during the time a winding is energized from said power supply.

9. Apparatus for controlling an induction motor as set forth in claim 8 wherein said speed voltage responsive means sequentially samples the induced voltage in each winding following the energized condition from said power supply.

10. Apparatus for controlling an induction motor as set forth in claim 9 including time delay means for delaying the sampling of an induced voltage for a predetermined period of time after the winding has been disconnected from said power supply.

11. Apparatus for controlling a three-phase induction motor having individual phase windings connected to a common junction comprising:

a direct current power supply including means for programming the output voltage in accordance with an input signal, said power supply connected to the common junction of said motor windings, a plurality of power switches individually connected to each winding of said motor and collectively connected to ground, sequential actuating means connected to said power switches to sequentially energize each winding of said motor from said power supply, thereby generating a rotating magnetic field in said motor, said sequential actuating means including means for controlling the frequency of said sequence in accordance with an input signal, a plurality of diodes individually connected to a winding of said motor and collectively connected to a common junction, said diodes being forward biased by a speed voltage and reverse biased when the associated winding is energized from said power supply, a differential amplifier having one input terminal connected to the common junction of the said diodes and a second input terminal connected to said power supply, the output of said amplifier being proportional to the difference between the speed voltage induced in said windings and the voltage applied to energize said windings, and a second differential amplifier having a first input terminal connected to the output of said first differential amplifier and a second input terminal connected to a slip voltage reference source, said second differential amplifier generating an output signal proportional to the voltages at said input terminals, said output voltage connected to the input of said sequential actuating means and said power supply.

12. Apparatus for controlling a three-phase induction motor as set forth in claim 11 including a time delay means connected between the first terminal of said first differential amplifier and the common junction of said diodes to introduce a time delay of a predetermined interval into the induced speed voltage signal connected to said first differential amplifier.

13. Apparatus for controlling a three-phase induction motor as set forth in claim 12 wherein said power switches are silicon controlled rectifiers having gate electrodes connected to said sequential actuating means.

14. Apparatus for controlling a three-phase induction motor as set forth in claim 13 including a commutator circuit for back biasing said silicon controlled rectifiers.

15. Apparatus for controlling a three-phase induction motor as set forth in claim 12 wherein said power switches are three terminal transistors including a base electrode connected to said sequential actuating means.

16. Apparatus for controlling a three-phase induction motor as set forth in claim 12 including a maximum speed set point voltage source for determining the maximum speed of said motor connected to the output of said second differential amplifier.

17. Apparatus for controlling a three-phase induction motor as set forth in claim 12 wherein said sequential actuating means produces three pulse trains which energize each winding for 120 electrical degrees.

18. Apparatus for controlling a three-phase induction motor as set forth in claim 15 wherein said sequential actuating means produces three pulse trains which energize each winding for 240 electrical degrees.

References Cited

UNITED STATES PATENTS

| | | | |
|---|---|---|---|
| 2,784,365 | 3/1957 | Fenemore et al. | 318—227 XR |
| 3,304,480 | 2/1967 | Ko. | |
| 3,317,805 | 5/1967 | Kay et al. | 318—231 |
| 3,372,323 | 3/1968 | Guyeska | 318—230 |

FOREIGN PATENTS 745,840    1/1954    Great Britain.

ORIS L. RADER, Primary Examiner

G. RUBINSON, Assistant Examiner

U.S. Cl. X.R.

318—227, 231